Oct. 30, 1962  S. STEINITZ  3,061,770

POWER TRANSMISSION

Filed Feb. 14, 1957

*INVENTOR.*
STEPHAN STEINITZ

BY

*ATTORNEY*

United States Patent Office 3,061,770
Patented Oct. 30, 1962

3,061,770
POWER TRANSMISSION
Stephan Steinitz, St. Louis, Mo., assignor to Vickers Incorporated, Detroit, Mich., a corporation of Michigan
Filed Feb. 14, 1957, Ser. No. 640,211
14 Claims. (Cl. 323—81)

This invention relates to power transmission and more particularly to saturable core inductive apparatus.

Saturable core inductive devices employed to modify the reactance of a circuit usually include a saturable core arrangement which carries main windings that are connected into an operational circuit to modify reactance characteristics of the circuit. The impedance of the main windings is controlled by adjusting the saturation of the core with unidirectional magnetization supplied to the core by means of direct current supplied either to a separate control winding on the core or to the main windings themselves.

In accordance with the present invention, two interconnected saturable core reactors are subjected to unidirectional magnetization by alternately shunting them with a unidirectional shunt in opposite directions with respect to voltages established across both reactors. Another aspect of the invention contemplates shunting the respective reactors with oppositely poled self-saturating reactor circuits, which among other advantages makes it possible to avoid the use of an extra control winding when a preamplifier is required.

It is therefore an object of the invention to provide a novel control arrangement for saturable core inductive apparatus.

Another object of the present invention is to provide a novel arrangement for providing unidirectional magnetization to saturable core inductive apparatus.

Still another object is to make it possible to use a lesser number of windings on certain arrangements of saturable core inductive apparatus.

A further object of the invention is to subject a saturable reactor arrangement with control unidirectional magnetization provided by current derived from the circuit in which the reactor arrangement is inserted.

Further objects and advantages of the present invention will be apparent from the following description, reference being had to the accompanying drawing wherein a preferred form of the present invention is clearly shown.

Figure 1:
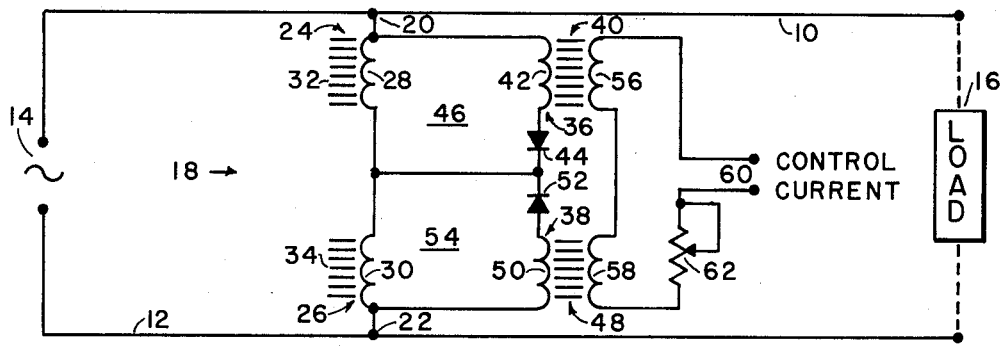
FIG. 1 is a diagram of one embodiment of the invention wherein direct coupling is used in connection with the main reactor.

Referring now to FIG. 1, conductors 10 and 12 indicate an A.C. circuit whose reactance characteristics are to be affected by an impedance to be inserted therein. The A.C. circuit 10—12 may be connected to an A.C. supply source 14, for example, the output of an alternator, or of an inverter circuit in which D.C. is converted to A.C., or to any other suitable source of A.C. Depending on the use and circuit arrangement, an additional load 16 may or may not be connected to the A.C. circuit 10—12. Saturable core inductive apparatus 18 embodying features of the invention is inserted in the A.C. circuit 10—12 at points 20—22.

The inductive apparatus 18 in the arrangement shown will modify the inductive loading on the A.C. circuit. In the case of an alternator such inductive loading can be used to control the output thereof. In the case of an inverter inductive loading may be used to change the net capacitive reactance of the commutating condenser thereby controlling the output voltage of the inverter.

Figure 2:
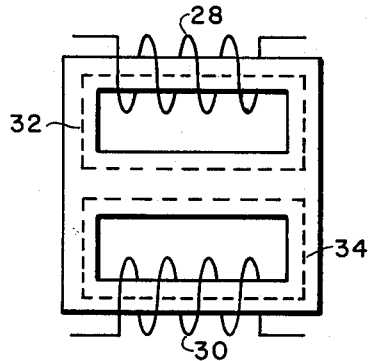
FIGS. 2 and 3 are examples of core arrangements which may be used in practicing the invention.

Included in the reactor apparatus 18 are saturable core reactors 24 and 26 having respectively windings 28 and 30 connected in series, one end of one winding being connected to one end of the other winding, while the other ends of the windings are coupled to the A.C. circuit at points 20 and 22. Reactors 24 and 26 are provided with separate magnetic circuits in the form of saturable cores 32 and 34, each of which is associated directly with only one of said windings, magnetic circuit 32 being encircled only by winding 28, while magnetic circuit 34 is encircled only by winding 30. While the magnetic circuits 32 and 34 may be two physically separate cores, they may take the form of two separate magnetic circuits on a physically single core such as the three-legged core shown in FIG. 2 wherein magnetic circuits 32 and 34 are symbolized by the dotted loops. In either case, the magnetic circuits 32 and 34 are considered separate circuits with respect to the windings encircling these magnetic circuits.

Figure 3:
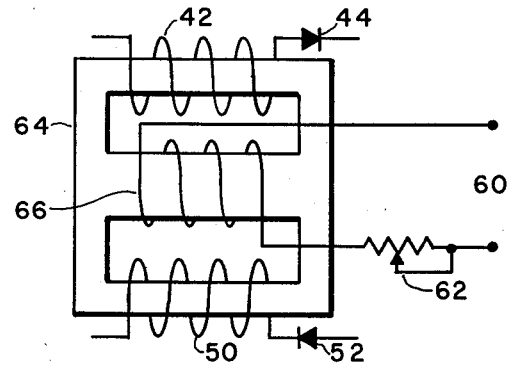

In order to control the impedance of the reactors 24 and 26, they are subjected to components of unidirectional magnetization, derived from voltages established across the windings 28 and 30, by means of oppositely poled unidirectional circuits 36 and 38 coupled respectively across windings 28 and 30. In the illustrated embodiment each of the unidirectional circuits 36 and 38 is a self-saturating reactor circuit characterized by a saturable core reactor main coil connected in series with a unidirectional valve. Unidirectional circuit 36 includes a saturable core reactor 40 carrying a main coil 42 connected in series with a half-wave rectifier 44, the coil and rectifier being coupled across the winding 28, and in the particular arrangement shown forming a closed circuit 46 including coil 42, rectifier 44, and a winding inductively related to magnetic circuit 32. On the other hand, unidirectional circuit 38 includes a saturable core reactor 48 with a main coil 50 in series with a half-wave rectifier 52, the coil and rectifier being coupled across winding 30, thus forming a closed circuit 54 which includes reactor main coil 50, rectifier 52 and a winding inductively related to the magnetic circuit 34. The reactances and consequently the output of the reactors 40 and 48 are controlled by a common control circuit including interconnected control windings 56 and 58 carried respectively by reactors 40 and 48 and connected to a source of control current 60 through an adjustable impedance 62. While reactors 40 and 48 may employ physically separate cores, they may utilize separate magnetic circuits on a single core such as the three-legged core 64 shown in FIG. 3, wherein a common control winding 66 is shown on the center leg of the core.

The unidirectional circuits 36 and 38 are oppositely poled with respect to A.C. voltages appearing across windings 28 and 30 at points 20 and 22, and thus are alternately conductive. This is due to the fact that rectifiers 44 and 52 are oppositely poled with respect to such voltages and conduct alternately on opposite half cycles of such voltages. For example, rectifier 44 conducts on one half cycle while rectifier 52 conducts on the opposite half cycle. Thus, with respect to A.C. voltages established across windings 28 and 30 these windings are alternately shunted by the unidirectional circuits thereacross, winding 28 being shunted by circuit 36 during the conductive half cycle of rectifier 44, while winding 30 is shunted by circuit 38 on the opposite half cycle when rectifier 52 conducts.

In operation, when point 20 is positive with respect to point 22, rectifier 44 is conductive while rectifier 52 is in the blocking direction. During this half cycle more or less current flowing from point 20 to 22 is shunted around winding 28 depending on the impedance of reactor 40 as set by the control current in winding 56. Also during this half cycle winding 30 gets the full current flow from point 20 to point 22 through the apparatus 18. On the next half cycle, point 22 is positive and rectifier 52 is conductive while rectifier 44 is in the blocking direction. During this half cycle more or less current flowing through apparatus 18 from point 22 to 20 is shunted around winding 30 depending on the impedance of reactor 48. Also during this half cycle, winding 28 gets the full flow of the current passing through apparatus 18 from point 22 to point 20.

As a result of the above action each of the windings 28 and 30 is subjected to components of unidirectional current which in turn generate components of unidirectional magnetization or D.C. saturation in the magnetic circuits of the respective reactors 24 and 26. The reactance of the respective reactors 24 and 26 will depend on the amount of unidirectional magnetization in the reactors 24 and 26 which in turn is dependent upon the impedances of the unidirectional circuits 36 and 38 which may be adjusted by changing the control current supplied to the control windings 56 and 58. Thus controlling the impedance of reactors 40 and 48 will result in a control of the reactance characteristics of the A.C. circuit 10—12 as modified or affected by the reactor apparatus 18.

Using analysis by superposition the reactors 24 and 26 may be considered as autotransformers of 1:1 ratio, and the unidirectional circuits 36 and 38 may respectively be considered loads on the transformers. Thus circuit 36 is a load across winding 28, while circuit 38 is a load across winding 30. According to this analysis there will be half-wave circulating currents through the closed circuit 46, which includes coil 42, rectifier 44 and winding 28. There will also be half-wave circulating currents through the closed circuit 54, which includes coil 50, rectifier 52, and winding 30. The half-wave currents will subject the reactors to unidirectional magnetization to a degree dependent upon the value of the half-wave currents which in turn are controlled by the respective impedances of the reactors 40 and 48.

It will be noted that the self-saturating reactor circuits including the reactors 40 and 48 together with their respective series rectifiers are a pre-amplifier with respect to the reactors 24 and 26. Generally a pre-amplifier working into a saturable reactor requires an additional control winding on the reactor plus an external source of power to supply the main coil of the pre-amplifier's. However, with the present invention the main coils of the self-saturating reactor circuits are supplied through windings 28 and 30 from the A.C. circuit in which the reactor apparatus 18 is inserted to affect the reactance thereof. Also, it will be noted that an extra control winding on reactors 24 and 26 has been avoided.

Figure 4:
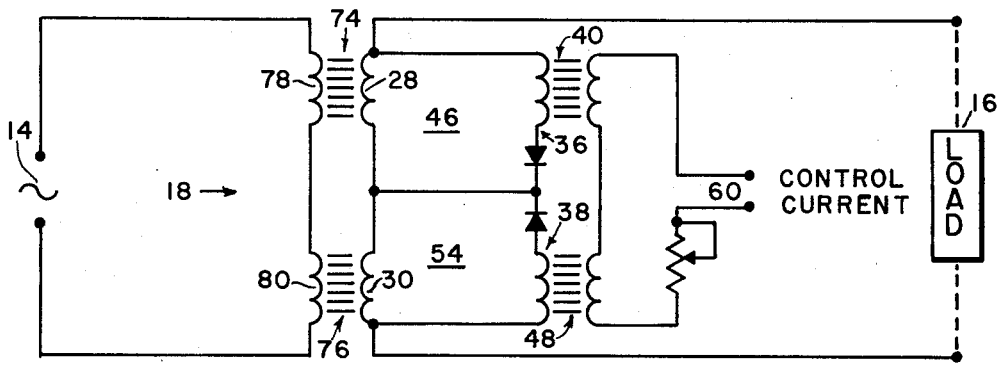
FIG. 4 is a diagram of another embodiment of the invention wherein transformer coupling is used to obtain voltage transformation and/or circuit isolation.

In FIG. 4 saturable transformers 74 and 76 take the place of reactors 24 and 26. The transformer analysis is more readily seen in this arrangement. Thus circuit 36 which is coupled across the primary 78 by means of winding 28 is seen to be a half-wave load on the transformer 74. Likewise circuit 38 which is coupled across the primary 80 through winding 30 is also readily seen to be a half-wave load on transformer 76. Primary windings 78 and 80 are respectively carried by the same magnetic circuits associated with windings 28 and 30, the same considerations applying here as in the circuit of FIG. 1. The current of FIG. 4 provides the opportunity for circuit isolation and for changing from 1:1 transformation to some other ratio.

It will be noted that in circuits of FIGS. 1 and 4 the components of unidirectional current are derived from the A.C. circuit in which the reactor apparatus 18 is inserted.

It will be further noted that in FIG. 4 that while circuit 36 is shunted across winding 28 by direct coupling it is also shunted across winding 78 by inductive coupling, the same considerations applying to transformer 76.

The materials and design considerations for the construction of saturable core reactors, transformers and self-saturating reactor circuits are well known and need no detailing or elaboration herein.

The application of the invention is not confined to the uses shown herein as the reactor apparatus may be coupled into any circuit wherein it is desired to affect the reactance thereof.

Any suitable control current of whatever nature or polarity that may be needed to effect the desired control of the reactors may be supplied to the control windings 56—58 or 66. The source 60 may, for example, be a battery.

While the form of embodiment of the invention as herein disclosed constitutes a preferred form, it is to be understood that other forms might be adopted, all coming within the scope of the claims which follow.

What is claimed is as follows:

1. Saturable inductive apparatus comprising saturable magnetic core means, winding means inductively related to said core means and having first and second sections connected in series for simultaneous conduction in the same direction, said core means including separate magnetic circuits inductively related respectively to said first and second sections, and control means for subjecting said core means to components of unidirectional magnetization, said control means comprising a unidirectional closed circuit associated with each of said magnetic circuits, each said closed circuit including an adjustable impedance and a winding inductively related to the magnetic circuit associated with that closed circuit, said unidirectional circuits being oppositely poled.

2. Saturable inductive apparatus for insertion in an A.C. circuit to affect the reactance of the circuit, said apparatus comprising saturable magnetic core means, winding means inductively related to said core means and having first and second sections, one end of one section being connected to one end of the other section, said sections being adapted to be coupled into and A.C. circuit to form a low resistance, high impedance shunt thereacross to affect the reactance of the circuit, said core means including a separate magnetic circuit for each of said winding means sections, and control means for subjecting said core means to components of unidirectional magnetization utilizing current derived from said A.C. circuit, said control means including a unidirectional closed circuit for each of said magnetic circuits, each said closed circuit including adjustable impedance means and a winding inductively related to the magnetic circuit associated with that closed circuit, the unidirectional circuits being oppositely poled with respect to an A.C. circuit in which said apparatus may be inserted.

3. Saturable inductive apparatus for insertion in an A.C. circuit to affect the reactance of the circuit, said apparatus comprising saturable magnetic core means, winding means inductively related to said core means and having first and second sections, one end of one section being connected to one end of the other section, the other ends of said sections being adapted for insertion in a circuit to form a low resistance, high impedance shunt thereacross to affect the reactance of the circuit, said core means including a separate magnetic circuit for each of said winding means sections, control means for subjecting said core means to components of unidirectional magnetization, said control means including a unidirectional circuit across each of said sections, the unidirectional circuits being oppositely poled with respect to A.C. voltages which may be established across said other ends of said winding means sections, and adjustable impedance means in the respective unidirectional circuits.

4. Saturable inductive apparatus comprising saturable magnetic core means, winding means inductively related to said core means and having first and second sections connected in series for simultaneous conduction in the same direction, said core means including separate magnetic circuits inductively related respectively to said first and second sections, and control means for subjecting said core means to components of unidirectional magnetization, said control means comprising a unidirectional closed circuit associated with each of said magnetic circuits, each said closed circuit including a winding inductively related to the magnetic circuit associated with that closed circuit and a self-saturating magnetic amplifier with a main coil supplied by said winding in the closed circuit, said unidirectional circuits being oppositely poled.

5. Saturable inductive apparatus comprising first and second saturable magnetic core means, winding means inductively related to said first core means and having first and second sections connected in series for simultaneous conduction in the same direction, said first core means including separate magnetic circuits inductively related respectively to said first and second sections, control means for subjecting said first core means to components of unidirectional magnetization, said control means comprising a unidirectional closed circuit associated with each of said magnetic circuits, each said closed circuit including a winding inductively related to the magnetic circuit associated with that closed circuit and a self-saturating magnetic amplifier with a main coil inductively related to said second core means and supplied by said winding in the closed circuit, said unidirectional circuits being oppositely poled.

6. Saturable inductive apparatus for insertion in an A. C. circuit to affect the reactance of the circuit, said apparatus comprising saturable magnetic core means, winding means inductively related to said core means and having first and second sections, one end of one section being connected to one end of the other section, said sections being adapted to be coupled into an A.C. circuit to form a low resistance, high impedance shunt thereacross to affect the reactance of the circuit, said core means including a separate magnetic circuit for each of said winding sections, and control means for subjecting said core means to components of unidirectional megnetization utilizing current derived from an A.C. circuit in which said sections are coupled, said control means including a unidirectional closed circuit for each of said magnetic circuits, each said closed circuit including a winding inductively related to the magnetic circuit associated with that closed circuit and a self-saturating magnetic amplifier with a main coil supplied by said winding in the closed circuit, the unidirectional circuits being oppositely poled with respect to an A.C. circuit in which said apparatus may be inserted.

7. Saturable inductive apparatus for insertion in an A.C. circuit to affect the reactance of the circuit, said apparatus comprising first and second saturable magnetic core means, winding means inductively related to said first core means and having first and second sections, one end of one section being connected to one end of the other section, said sections being adapted to be coupled into an A.C. circuit to form a low resistance, high impedance shunt thereacross to affect the reactance of the circuit, said first core means including a separate magnetic circuit for each of said winding means sections, and control means for subjecting said first core means to components of unidirectional magnetization utilizing current derived from an A.C. circuit in which said sections are coupled, said control means including a unidirectional closed circuit for each of said magnetic circuits, each said closed circuit including a winding inductively related to the magnetic circuit associated with that closed circuit and a self-saturating magnetic amplifier with a main coil inductively related to said second core means and supplied by said winding in the closed circuit, the unidirectional circuits being oppositely poled with respect to an A.C. circuit in which said apparatus may be inserted.

8. Saturable inductive apparatus for insertion in an A.C. circuit to affect the reactance of the circuit, said apparatus comprising saturable magnetic core means, winding means inductively related to said core means and having first and second sections, one end of one section being connected to one end of the other section, the other ends of said sections being adapted for insertion in a circuit to form a low resistance, high impedance shunt thereacross to affect the reactance of the circuit, said core means including a separate magnetic circuit for each of said winding means sections, each said section having associated therewith a self-saturating magnetic amplifier with its main winding and series unidirectional valve coupled across the section, said valves being oppositely poled.

9. Saturable inductive apparatus for insertion in an A.C. circuit to affect the reactance of the circuit, said apparatus comprising saturable magnetic core means, winding means inductively related to said core means and having first and second sections, one end of one section being connected to one end of the other section, the other ends of said sections being adapted for insertion in a circuit to form a low resistance, high impedance shunt thereacross to affect the reactance of the circuit, said core means including a separate magnetic circuit for each of said winding means sections, and control means for subjecting said core means to components of unidirectional magnetization, said control means including a unidirectional circuit coupled across each of said sections, each said unidirectional circuit comprising a saturable reactor main winding and a unidirectional valve connected in series, said valves being oppositely poled with respect to A.C. voltages which may be established across said other ends of said winding means sections, and common control circuit means for adjusting the impedance of said saturable reactor main windings.

10. Saturable inductive apparatus for insertion in an A.C. circuit to affect the reactance of the circuit, said apparatus comprising saturable magnetic core means, first winding means inductively related to said core means and having first and second sections, one end of one section being connected to one end of the other section, said sections being adapted to be coupled into an A.C. circuit to form a low resistance, high impedance shunt thereacross to affect the reactance of the circuit, said core means including a separate magnetic circuit for each of said winding means sections, and control means for subjecting said core means to components of unidirectional magnetization, said control means including a unidirectional closed circuit for each of said magnetic circuits, each said closed circuit including adjustable impedance means and second winding means inductively related to the magnetic circuit associated with that closed circuit, the unidirectional circuits being oppositely poled with respect to an A.C. circuit in which said apparatus may be inserted.

11. Saturable inductive apparatus for insertion in an A.C. circuit to affect the reactance of the circuit, said apparatus comprising saturable magnetic core means, first winding means inductively related to said core means and having first and second sections, one end of one section being connected to one end of the other section, said sections being adapted to be coupled into an A.C. circuit to form a low resistance, high impedance shunt thereacross to affect the reactance of the circuit, said core means including a separate magnetic circuit for each of said winding means sections, and control means for subjecting said core means to components of unidirectional magnetization utilizing current derived from an A.C. circuit, said control means including a unidirectional closed circuit for each of said magnetic circuits, each said closed circuit including second winding means inductively related to the magnetic circuit associated with that closed circuit and a self-saturating magnetic amplifier with a main coil supplied by said winding in the closed circuit, the unidirectional circuits being oppositely poled with respect to an A.C. circuit in which said apparatus may be inserted.

12. Saturable inductive apparatus for insertion in an A.C. circuit to affect the reactance of the circuit, said apparatus comprising first and second saturable magnetic core means, first winding means inductively related to said first core means and having first and second sections, one end of one section being connected to one end of the other section, said sections being adapted to be coupled into an A.C. circuit to form a low resistance, high impedance shunt thereacross to affect the reactance of the circuit, said core means including a separate magnetic circuit for each of said winding means sections, and control means for subjecting said core means to components of unidirectional magnetization utilizing current derived from an A.C. circuit, said control means including a unidirectional closed circuit for each of said magnetic circuits, each said closed circuit including second winding means inductively related to the magnetic circuit associated with that closed circuit and a self-saturating magnetic amplifier with a main coil inductively related to said second core means and supplied by said winding in the closed circuit, the unidirectional circuits being oppositely poled with respect to an A.C. circuit in which said apparatus may be inserted.

13. Saturable inductive apparatus comprising first and second saturable reactors, each having a winding, said windings being connected in series for simultaneous conduction in the same direction, and means for subjecting said reactors to unidirectional magnetization, said means comprising means for alternately shunting said windings with a unidirectional shunt in opposite directions.

14. Saturable inductive apparatus comprising first and second saturable reactors, each having a winding, said windings being connected in series for simultaneous conduction in the same direction, and means for subjecting said reactors to unidirectional magnetization, said means comprising means for alternately shunting said windings with a unidirectional shunt in opposite directions, the latter means comprising for each saturable reactor a self-saturating reactor circuit coupled across said winding of that saturable reactor, said self-saturating reactor circuits being oppositely poled.

References Cited in the file of this patent

UNITED STATES PATENTS

| 2,731,521 | Crawford | Jan. 17, 1956 |
| 2,858,503 | Rowley et al. | Oct. 28, 1958 |

FOREIGN PATENTS

| 758,729 | Great Britain | Oct. 10, 1956 |
| 1,121,138 | France | Apr. 30, 1956 |